Dec. 1, 1959   E. V. SHAW   2,915,082
AUTOMOBILE BEVERAGE CONTAINER ASSEMBLY
Filed Dec. 3, 1956   2 Sheets-Sheet 1
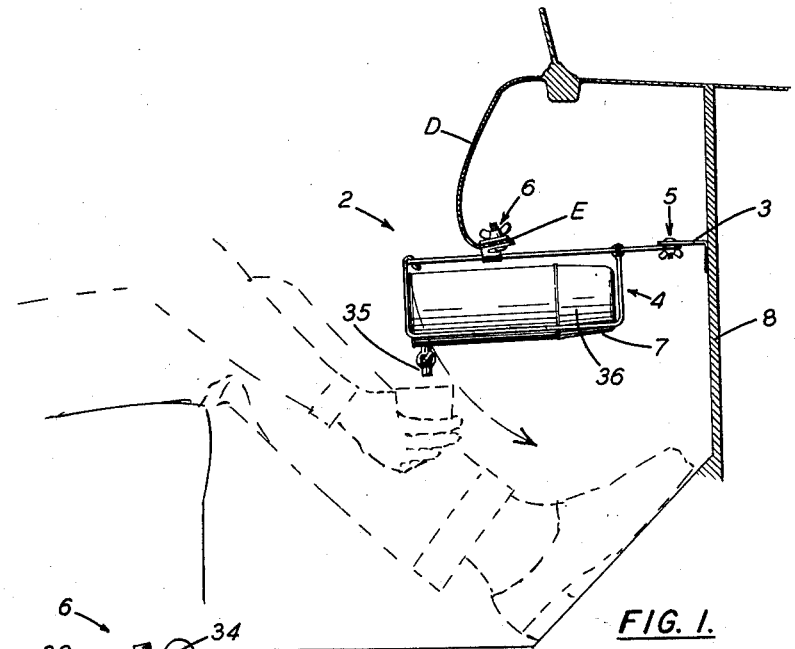
FIG. 1.
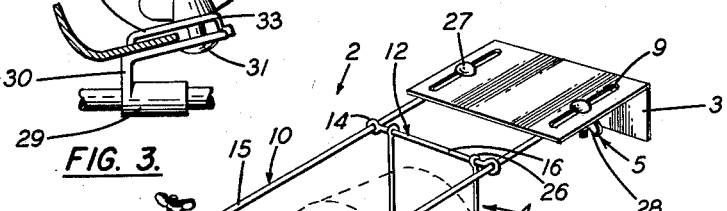
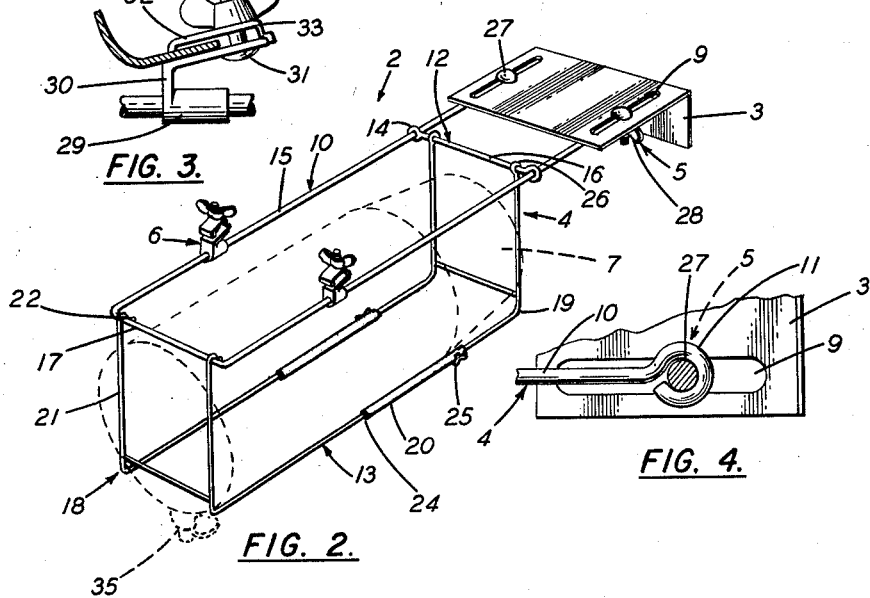
FIG. 3.
FIG. 2.
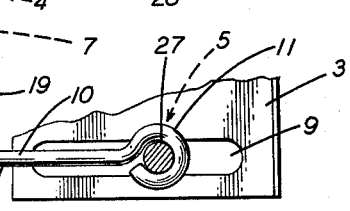
FIG. 4.
INVENTOR.
E. V. SHAW
BY
J. D. Copeland Jr.
AGENT

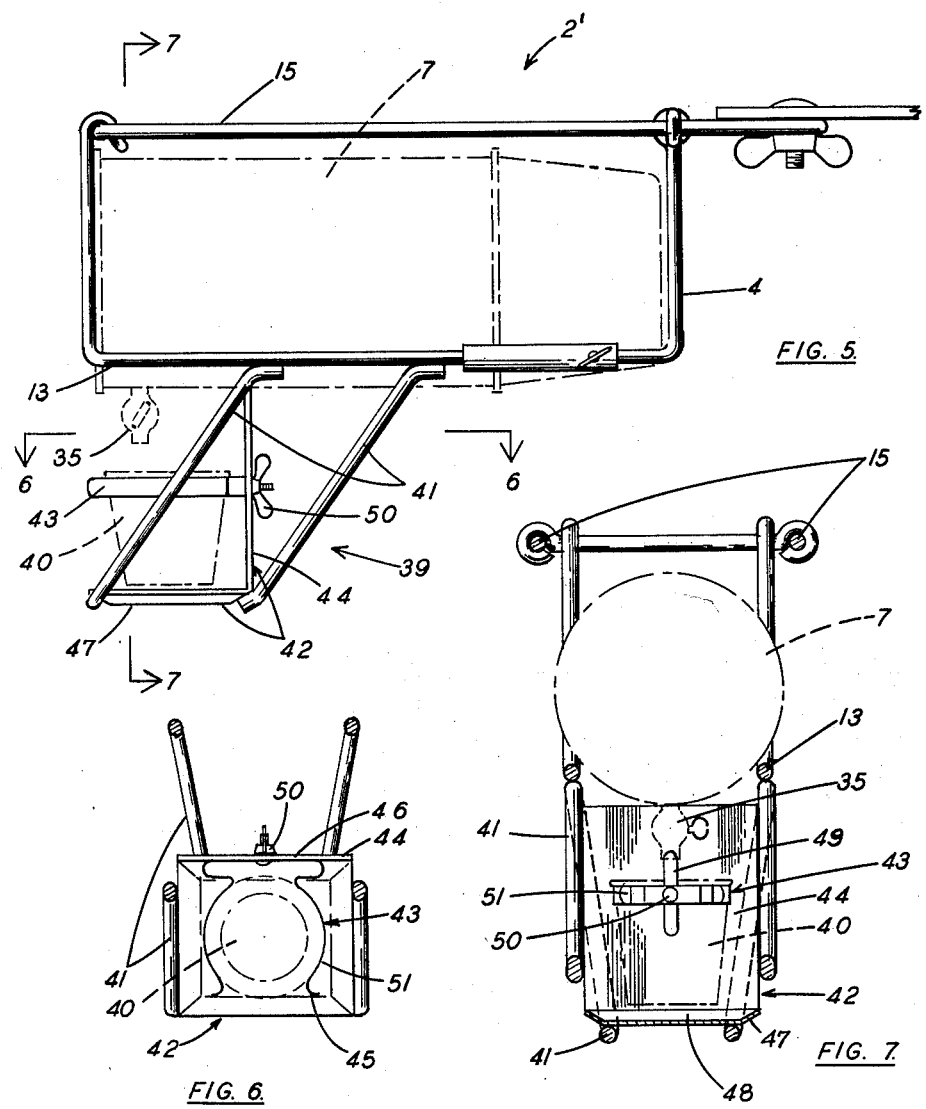

United States Patent Office 2,915,082
Patented Dec. 1, 1959

2,915,082

AUTOMOBILE BEVERAGE CONTAINER ASSEMBLY

Evart V. Shaw, Garland, Tex.

Application December 3, 1956, Serial No. 626,055

4 Claims. (Cl. 137—353)

This invention relates generally to automobile accessories, and more particularly to such an accessory for dispensing liquid beverages.

The primary object of this invention is to provide a beverage container assembly for vehicles to permit either the driver or passengers to conveniently and safely serve beverages in the vehicle.

Another object is to provide a beverage container assembly for vehicles to permit the driver to dispense his own drink (non-alcoholic) while the car is in motion without adversely effecting his control of the vehicle.

An additional object is to provide a unique frame to attach under the dash board of a conventional automobile to retain a beverage container in drink dispensing relation.

A still further object is to provide a beverage container frame for installation in an automobile which is instantly adjustable to fit various makes and sizes of cars.

And yet another object is to provide a beverage container frame which is readily adjustable to receive different size vacuum bottles for dispensing liquid beverage.

And another object is to provide an extremely economical and yet exceedingly effective dispensing beverage container assembly for installation in vehicles.

And still another object is to provide a combined beverage dispenser and cup holder whereby the cup may be retained against spillage and may be filled without requiring the automobile operator's attention.

These and other objects will become apparent upon examination of the following specification and drawing in which:

Fig. 1 represents a side elevational view partially in cross-section showing the installation of the beverage container assembly of this invention.

Fig. 2 is a perspective view of the wire frame assembly and showing a beverage dispenser in phantom outline for clarity of illustration.

Fig. 3 is a fragmentary detail view showing the dash attaching clamp in its installed position.

Fig. 4 is a detail fragmentary view of the method of attaching the frame assembly to the firewall bracket in adjustable relation.

Fig. 5 is a side elevational view of a modified embodiment of the device of Fig. 1.

Fig. 6 is a cross sectional view taken along the lines 6—6 of Fig. 5.

Fig. 7 is a cross sectional view taken along the lines 7—7 of Fig. 6.

Referring now more particularly to the characters of reference of the drawing, it will be observed that the complete beverage container assembly 2 of this invention consists basically of a firewall bracket 3, a wire frame group 4, a pair of wing nut assemblies 5, a pair of dash attaching clamps 6, and a dispensing type beverage container 7.

The firewall bracket 3 may be a relatively thin cross-section short length of angle stock material which is brazed or otherwise attached (not shown) to an automobile firewall 8 and which includes a pair of longitudinally extending slots 9. This bracket 3 forms one anchor point for assembly 2 in the automobile.

The wire frame group 4 is made in three parts, i.e.: a longitudinally extending U section 10 having eyelets 11 at each free end thereof; a captive cross member 12; and a swinging cradle section 13. The cross member 12 has eyelets 14 formed around the longitudinal runners 15 of U section 10 at each end at a location fixed by the length of shank 16. This length corresponds to the length of forward cross piece 17 of section 10 and to the lateral spacing of slots 9 of bracket 3. The cradle section 13 while functioning as one piece is actually made in two similar L-shaped sections 18 and 19 connected together by a hollow tube 20. The rear L section 18 includes a pair of spaced uprights 21 each having an upper hook end 22 to overlap and engage cross piece 17 when the frame is closed. Tubes or spacers 20 at the lower part of each L section 18 and 19 provide for a rigid but adjustable cradle section 13 when the latter is supporting the weight of the container or vacuum bottle 7. One end of tube 20 is welded or brazed as at 24 to L section 18 while the other end is open to permit telescopic engagement with L-section 19 so that the overall length of cradle 13 may be adjusted to fit different size bottles 7 and to bind against them in snug rattle-free relation. When cradle 13 has been set at the proper length, wing bolt 25 is tightened through threads in tube 20 against the engaged ends of section 19 to lock the wire group 4 into one rigid self contained unit. The vertical ends of section 17 include eyelets 26 which loop around captive cross members 12 in free swinging relation.

The wing nut assemblies 5 comprise a carriage bolt 27 and a wing nut 28 and are so positioned as to be readily accessible from the bottom side of bracket 3 when the latter is installed on firewall 8. It will be seen that by loosening and retightening nut assemblies 5, the distance from firewall 8 and the rear end of wire group 4 may be adjusted the full length of slot 9 to accommodate installation in various makes of autos.

The dash attaching clamps 6, as the name implies, clamp and thus provide the second anchor point between the assembly 2 and the automobile. The clamp 6 includes a sleeve member 29 having an upward extending angle shaped base plate 30 with a hole therethrough to receive bolt 31. A top plate 32 having downward turned ends 33 is adapted to engage base plate 30 and bind against the thin bottom edge E of dash panel D when wing nut 34 is tightened. This action securely binds the container assembly 2 in rattle-free relation to the dash panel D.

The vacuum bottle 7 may be of any conventional make so long as it has a transversely projecting spigot 35 near one end and is within a reasonable tolerance of the nominal dimensions of a standard bottle. Due to the lower longitudinal wire members including tubes 20 and due to the wire uprights 21, a round bottle 7 may vary noticeably in its diameter and still be made to snugly fit in wire group 4 when the latter is tightened lengthwise. The bottle 7 shown in Fig. 1 includes a removable end cap 36 for refilling, and to gain access to or install bottle 7, the cradle section 13 is disengaged from U section 10 by pulling out on uprights 21 to release hooks 22 and permit cradle section 13 to swing downward as shown by the arrow by the pivoting action of eyelets 21 about shank 16 of cross member 12. With the cradle 13 in its lower position, bottle 7 may be lifted out or inserted into wire group 4 and then relatched into carrying position with spigot 35 facing down for ready use by a passenger. To pour liquid from bottle 7, the cup may be held in the same hand that turns spigot 35, so that even the driver may fill his drinking cup while the car is in motion with no more effort or distraction than required in manipulating the conventional dash mounted cigarette lighter. For best results, bracket 3 should be located so that bottle 7 when installed will be at a slight incline toward the spigot end.

In the modified embodiment 2' shown in Figs. 5–7, a holder frame 39 for cup 40 is supported from cradle 13 of wire group 4 by virtue of the diagonal braces 41 which attach cradle 13 and L bracket 42. The bracket 42 is of sufficient dimensions to receive the largest cup which will be used, and once the size of the cup is determined, cup clamp 43 is adjusted and attached to the rear vertical member 44 of bracket 42. Clamp 43 is of spring type material so that the pressure of cup 40 will cause the clamp to first expand and then regrip the cup when the latter is in place. The forward end of clamp 43 has outwardly curved tips 45, and the rear end of the clamp includes a transverse flange 46 with a bolt hole therein. Bracket 42 includes a solid bottom plate 47 which is dished out slightly to form a sump 48 to retain any liquid which might drip from spigot 35 and thus will protect the auto floor board. The vertical member 44 of bracket 42 includes a vertical slot 49 to permit clamp 43 to be moved up or down for adjustment by means of the bolt and wing nut assembly 50 to fit different size or type cups. Clamp 43 also inherently contains a lateral adjustment feature in that arms 51 can be manually spread or contracted to fit the diameter of the cup desired. Diagonal braces 41 are welded, brazed, or otherwise attached to wire group 4 at installation, and the use of this type of bracing leaves the front end of frame 39 open to receive a cup from the forward direction. The dimensions of clamp 43 may be adjusted vertically to cause cup 40 to be held clear of bottom plate 48 as would be desired when using rigid material cups so that the bottom of the cup will be free from contact with any spilled beverage; or clamp 43 may be adjusted to cause the cup bottom to rest on plate 48 as may be desired when using light weight paper cups.

The convenience and safety of the use of embodiment 2' will be apparent when it is visualized that the driver may fill a beverage cup when driving without even taking his eyes off the road, and except for a matter of seconds without requiring the use of even one hand since the spigot 35 will cause the beverage to pour after the initial turn and the driver can then listen and turn off the spigot when the sound indicates the cup is filling up. The driver may then wish to leave the filled cup in place for an interval until it is convenient to remove the cup 40 which may also be done without looking at the holder.

From the foregoing description it will be readily seen that there has been produced a device which substantially fulfills the objects of this invention as set forth herein. The invention is not limited to the exemplary constructions herein shown and described, but may be made in many ways within the scope of the appended claims.

What is claimed is:

1. A beverage container assembly for installation in a vehicle, comprising: a frame, a beverage container cradled in a longitudinally extending position in said frame, adjustable means for mounting different size cross section and different length containers in said frame, means on said container for dispensing liquid from said container in a direction transverse to the length of said container while said container is in said frame, said frame having movable means providing for the removal of said container from said frame for servicing.

2. A beverage container assembly for installation in a vehicle, comprising: a frame, said frame including a wire group forming a square cross-section of four longitudinally extending members and shaped to inclose a beverage dispenser, a longitudinally extending beverage dispenser in said group and resting on two only of said members, means for mounting said wire group in a horizontal position, and pivoted means in said wire group providing for removal of said beverage dispenser.

3. A structure for adjustably mounting a beverage container between the dash panel and the firewall of a vehicle, comprising: a longitudinally extending cradle, a U-shaped member having legs parallel to the cradle and an arch portion, a cross member slideably engaging said legs, said cradle having a portion pivotally engaging said cross-member and a portion detachably engaged to the arch portion, adjustable means in said cradle to accommodate different length beverage containers, and means for mounting said cradle in a substantially horizontal position.

4. The structure set forth in claim 3 including a cup supporting frame extending downward from the cradle.

References Cited in the file of this patent

UNITED STATES PATENTS

| | | |
|---|---|---|
| 1,624,830 | Emsley | Apr. 12, 1927 |
| 2,112,471 | Sevelle | Mar. 29, 1938 |
| 2,302,170 | Basler | Nov. 17, 1942 |
| 2,626,119 | Crosby | Jan. 20, 1953 |
| 2,661,015 | Allred et al. | Dec. 1, 1953 |
| 2,670,165 | Dominguez | Feb. 23, 1954 |
| 2,708,540 | Cook | May 17, 1955 |